(12) United States Patent
McCutchen

(10) Patent No.: US 7,973,838 B2
(45) Date of Patent: Jul. 5, 2011

(54) ACTIVE MASK FOR ELECTRONIC IMAGING SYSTEM

(75) Inventor: David McCutchen, Portland, OR (US)

(73) Assignee: Immersive Media Company, Portland, OR (US)

( * ) Notice: Subject to any disclaimer, the term of this patent is extended or adjusted under 35 U.S.C. 154(b) by 729 days.

(21) Appl. No.: 11/712,247

(22) Filed: Feb. 27, 2007

(65) Prior Publication Data

US 2008/0007645 A1    Jan. 10, 2008

Related U.S. Application Data

(60) Provisional application No. 60/819,187, filed on Jul. 7, 2006.

(51) Int. Cl.
*H04N 9/04* (2006.01)
*H04N 3/14* (2006.01)

(52) U.S. Cl. ...... 348/276; 348/296; 348/362; 250/201.1

(58) Field of Classification Search .................. 348/276, 348/360, E5.024, 365, 216, 217
See application file for complete search history.

(56) References Cited

U.S. PATENT DOCUMENTS

| | | | | |
|---|---|---|---|---|
| 4,546,248 A * | 10/1985 | Craig | ............................. | 250/225 |
| 4,918,534 A * | 4/1990 | Lam et al. | ..................... | 348/367 |
| 5,015,057 A | 5/1991 | Rumbaugh et al. | | |
| 5,047,847 A * | 9/1991 | Toda et al. | ....................... | 348/68 |
| 5,541,705 A * | 7/1996 | Kan et al. | ...................... | 396/233 |
| 5,797,050 A | 8/1998 | Smith | | |
| 5,841,507 A * | 11/1998 | Barnes | ............................. | 351/49 |
| 6,307,586 B1 * | 10/2001 | Costello | ...................... | 348/216.1 |
| 6,863,405 B2 | 3/2005 | Bechtel et al. | | |
| 6,864,473 B2 * | 3/2005 | Chretien et al. | ........... | 250/201.1 |
| 6,952,233 B2 * | 10/2005 | Nagano | ......................... | 348/362 |
| 7,154,649 B2 * | 12/2006 | Pfefferseder et al. | ....... | 359/225.1 |
| 7,158,180 B2 * | 1/2007 | Neidrich | ........................ | 348/340 |
| 7,586,536 B2 * | 9/2009 | Kato et al. | ..................... | 348/360 |
| 2006/0044458 A1 * | 3/2006 | Kato et al. | ..................... | 348/360 |

OTHER PUBLICATIONS

Stauth, David, OSU Engineers Create World's First Transparent Transistor, Oregon State University News and Communication Services, Mar. 24, 2003, http://oreoonstate.edu/dept/ncs/newsarch/2003/Mar03/transparent.htm.
physorg.com, Researchers create world's first transparent integrated circuit, http://www.physorg .com/news11894.html, Mar. 18, 2006.
physorg.com, New research could lead to 'invisible' electronics, http://www.physorg.com/news86012898.html, Feb. 22, 2006.
deviceforge.com, World's first completely transparent IC, http://www.deviceforge.com/news/NS4777763425.html, Mar. 20, 2006.
Karioja et al., "Optical Attenuator Using Liquid Crystal Film"; Proc. SPIE vol. 2175; Apr. 1994; pp. 183-190.

* cited by examiner

*Primary Examiner* — Hung H Lam
(74) *Attorney, Agent, or Firm* — Marger Johnson & McCollom PC

(57) ABSTRACT

An active pixel masking system for automatic glare suppression uses a variably transmissive screen such as an LCD in front of a lens. A measurement by an image sensor of oversaturated pixels from one or more extremely bright lights is used to generate corresponding opaque pixels in the variably transmissive screen, thereby preventing the excess light from entering the lens, and thereby clarifying the appearance of any objects near to the bright light. A continuous reading of a motion picture image is used to move the location and area of the opaque pixels in response to the motion and area of the light.

11 Claims, 2 Drawing Sheets

ACTIVE MASK FOR ELECTRONIC IMAGING SYSTEM

RELATED APPLCIATION

This application claims priority from U.S. provisional application No. 60/819,187 filed Jul. 7, 2006.

GENERAL FIELD

This disclosure generally relates to optical devices for lenses. It also is related to digital video and other electronic image camera systems.

BACKGROUND ART

The experience of photography outdoors typically has to contend with the sun. The bright, concentrated light from the sun, especially on a cloudless day, causes glare as it enters a camera lens, and washes out detail nearby to the sun in the camera image. In some cases, this means that a significant amount of the potential image is lost. The same phenomenon can be found with other bright light sources such as headlights and streetlamps in a night scene.

Bright lights cause many adverse effects in an electronic imaging system. In analog imaging systems such as vidicon tubes, the burned-in area from such a bright light source can causes a trail to be left behind when either the camera or the light source is in motion, and can even cause a permanently damaged spot on the tube. In charge-coupled-device (CCD) video systems, the sensor chips react to extreme light sources by what is called "spill" or "blooming" where the electrical charge caused by the light spills over into adjacent cells on the sensor, especially those directly underneath, leading to large vertical bright streaks in the image from the location of the bright light sources.

These bright lights also have adverse effects in lenses. They cause internal reflections among the glass lens elements which produce ghost images. In addition, the bright light interacts with the air-glass surface and produces a hazy spreading of the light, which is amplified by any dirt, grease or moisture on the lens.

Many modifications to an optical system have been attempted to cut down on glare. Polarizing filters cut down on stray light but cannot reduce the appearance of the sun sufficiently to make details in the image nearby it reappear. Lens hoods also cut down on stray light entering the scene from outside of the image field of view, but cannot compensate for any points of overexposure within the field of view itself. Neutral density filters and internal irises cut down on the light entering the lens, but at the expense of an overall darkening of the scene.

Other inventions have attempted to regulate the light in the image system. For example, Bechtal, et. al. in U.S. Pat. No. 6,863,405, uses a dimming mirror controlled by a glare sensor in a vehicle, to regulate the reflectivity of a rear-view mirror to prevent headlights from being reflected into the driver's eyes. This refers to an overall control applied to the mirror, based on an overall reading of brightness, especially when it is compared to the ambient overall lighting. When these are too disparate, they create what is called a glare threshold.

In camera systems, overall variation of the sensitivity of the sensor can be used to control the effect of bright lights shining into the lens. Auto-iris systems using a physical lens iris, or auto-exposure using faster or slower shutter speeds, both can regulate the appearance of a video image or other digital or analog image-making system. However, these apply only to the overall image, not to any portion of it in particular.

In another approach to regulating light within an camera, Karioja et. al. in "Optical Attenuator Using Liquid Crystal Film" describes using an a film of liquid crystal droplets, located between a lens an a sensor, as an overall variable light scattering device that would have the effect of regulating exposure. However, this too applies to the entire image, and does not affect the light entering the lens.

OBJECTS AND ADVANTAGES

This disclosure describes an active filter for automatic glare suppression which applies a variable mask to control the light entering a lens, in order to reduce or eliminate the effects of glare from bright light sources, thereby recovering the appearance of objects near to these light sources which would otherwise be lost to the effects of such lights entering a lens.

The mask is dynamically variable to cover bright lights that are in motion, either from the motion of these lights or the motion of the camera or both. This motion is automatic and does not necessarily require intervention by the camera operator. This makes it especially useful for electronic motion picture systems.

The appearance of the scene without the mask can be recovered by a simple color substitution to fill in the area of the mask as a final stage, yielding a final image that has for better detail in the area near the bright light source than would otherwise be the case.

A self-contained head-mounted system including a display can allow an operator to look at a scene wherein bright lights are minimized and overall image clarity is enhanced.

DETAILED DESCRIPTION

In the discussion that follows, terms such as "video", "light", "lens", "LCD", "CCD" and "camera" are used to describe the function and operation of the present disclosure. No particular limitations should be inferred from these terms; they are used as general descriptions of the components of an electronic imaging system.

In the present disclosure, in an electronic imaging system, which can be either analog or digital, a variably transmissive pixilated screen such as a clear liquid crystal display (LCD) screen is placed in front of the camera lens and an image sensor is in back of the lens and in line with its optical axis, so that the image sensor is exposed to light representing the components of a field of view.

There are several methods of construction used to make an LCD screen. In one implementation, the construction of an LCD includes two oppositely oriented polarizing filters with polarizations orthogonal to each other. Between them, contained within clear substrate walls, is a liquid crystal layer that changes the polarization of light to allow the light to pass through both polarized filters. When an electrical charge is applied, the twist of the crystal is turned off for individual pixels to partially or totally block this light transmission. In its uncharged state, the LCD is transparent, but it acts like a polarizing filter matching the polarization of the entry filter, the one closest to the light source, since only light that matches this polarization will be allowed through the system. This polarization therefore already has the effect of suppressing glare from reflections and other light sources, in a manner that can already be seen in polarized sunglasses, which make use of a vertical polarizer as the entry filter to block horizontally polarized light such as reflections off water.

In the present disclosure, light from an extremely bright light source passes through this LCD screen and the lens and causes an oversaturation of a selected corresponding area of the sensor. For example, in the case of a Charge-Coupled Device (CCD) the bright light source causes an electrical image output level to rise above an optimal limit. At this point, the image is pure white, plus an excess charge that in the case of a CCD spills over into adjacent pixel rows. When this condition of an excess pixel charge in certain pixels is detected by a monitoring circuit, the corresponding pixels in the LCD screen are opaqued to mask out the incoming light, thereby shielding the sensor from the excess light and preventing the resultant glare in the image.

Figure 1:
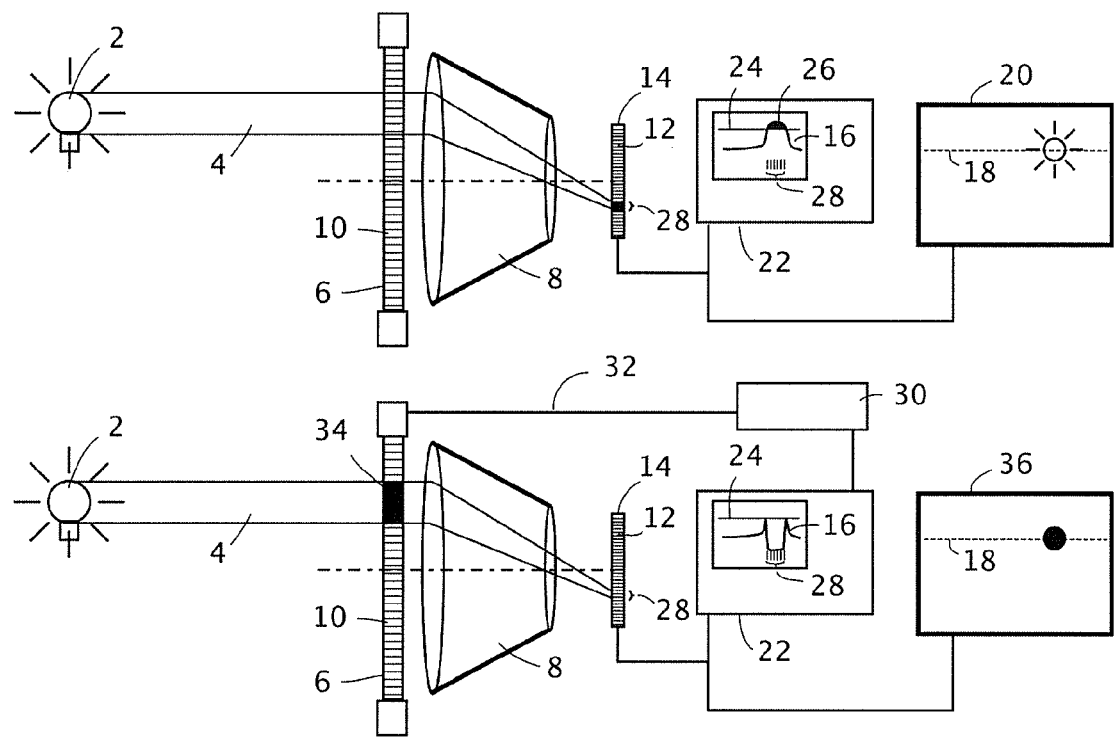
FIG. 1 Overview of the glare suppression system
FIG. 2 Flow diagram showing basic system components
FIG. 3 Flow diagram of graduated response
FIG. 4 Illustration of the automatic tracking of motion.

This is illustrated in FIG. 1. A very bright light source at 2 emits light 4 which passes through an LCD screen 6 and a subsequent lens 8. This LCD screen has pixel divisions 10 which correspond to the pixel divisions 12 of an image sensor 14 behind the lens 8. This image sensor 14 emits electrical signals 16, which typically correspond to the intensity of the light for successive sequences of pixels, such as the row shown at 18, which are used in constructing an image 20. A limiting circuit 22 detects any signals within any pixel sequence over a given threshold 24, typically expressed in video signals as 100 IRE units, which correspond to glare or other undesired effects in the image. The excess light 4 from the bright light source 2 therefore creates excess oversaturated signal levels 26 for certain pixels 28 in the sensor. To correct the oversaturation of these pixels on the sensor, as shown in the second part of FIG. 1, a masking processor 30 outputs a masking signal 32 to the LCD screen 6 in front of the lens 8 to opaque or otherwise darken the pixel locations on the LCD screen 34 that correspond to the locations of the oversaturated pixels 28 in the sensor 14. This opaquing of the LCD therefore masks the incoming light 4 from entering the lens 8 and reaching the sensor, and thereby greatly reduces the secondary effects of flare, glare and blooming in the final image 36.

Figure 2:
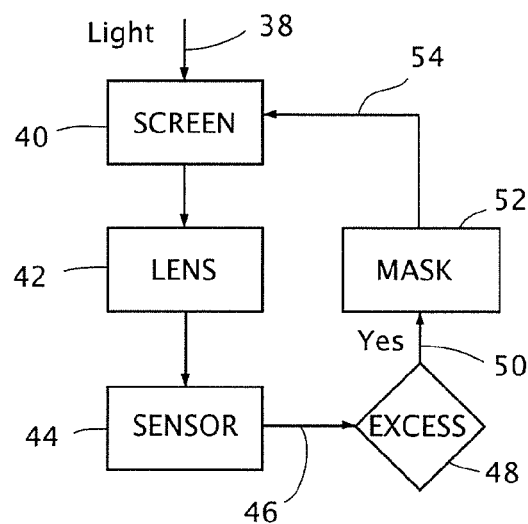
Figure 3:
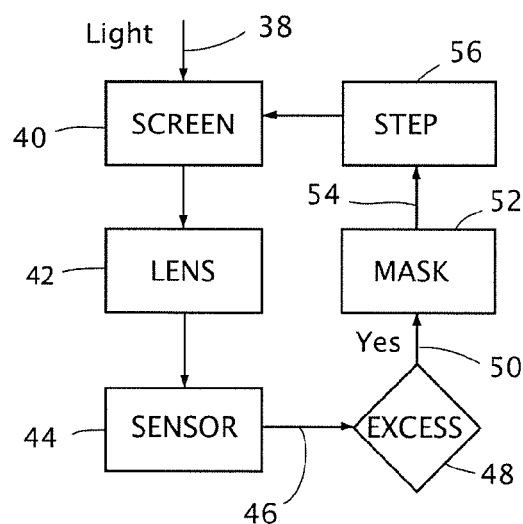

FIG. 2 is a flow diagram showing these basic functions. The incoming light is at 38, and the variably transmissive screen is at 40. The light passes through a lens at 42 to an image sensor 44. The sensor signal 46 is measured 48 to see if it exceeds a given limit. If the answer to this is yes 50 then a masking processor generates a signal 54 to opaque or otherwise darken the pixels in the variably transmissive screen 40 that correspond to the pixels in the image sensor that have been found to be oversaturated or otherwise exceed a given limit. FIG. 3 is a flow diagram that shows how this response can be graduated to avoid overcompensation. A step function 56 regulates the amount of correction to be applied to the oversaturated pixels for each frame period. For example, the initial correction applied to the oversaturated pixels might be only 50% opacity instead of 100% opacity. If the result of a subsequent measurement 50 shows that this correction is sufficient to prevent oversaturation and prevent glare, then no further correction is done. If the pixels are still shown to be oversaturated, then a further amount of opacity, for example 75% instead of 50% is applied during the next frame cycle, and continuously measured and increased each frame cycle until the desired result is accomplished. The amount of correction per frame cycle can be adjusted according to the desired speed of correction. If the amount of oversaturation can be accurately measured, then the amount of correction to be applied can be better estimated. However, it is more typical that oversaturation tends to overload the ability of the sensor to measure the excess. This step function 56 can also serve to decrease the amount of masking required. To prevent transient lights from creating persistent masks, the measurement of the pixels and the generation of their appropriate masks should continuously measure whether the mask should be increased, decreased, or eliminated altogether. For example, a bright light may create a signal level well in excess of the target limit of 100 IRE units. It may have been previously determined that for best optical performance in the lens and in the system overall, such a bright light should be suppressed to create a signal of 90 IRE. Therefore, a mask of 90% might be found to create this during a given frame period. However, during a subsequent frame, the light is dimmed, so that the 90% mask now creates a level of 45 IRE. Therefore the mask should be decreased in density to restore the target 90% level. The effect of this continuous sampling and adjustment process is to decrease the necessary density of the masks. This prevents unnecessary subtractions from the overall image, and allows the masks to go away if the lights disappear.

A light's disappearance can be sensed in several ways. Since the usual effect of the masking of a bright light is a darkened spot surrounded by a bright but not oversaturated halo, image analysis that detects the disappearance of this halo can be used as a signal to turn off the mask. A second method is to periodically turn down the density of the mask and test whether the image becomes oversaturated. If so, then the density if increased. If not, the density remains at the reduced level, and further reductions can lead to the mask disappearing altogether if the light does not require it. A third method is to periodically turn off the mask and sample the current image intensity, and reinstate it if required. This method, however, may lead to more image degradation because of blinking lights and periodic glare appearing and disappearing rapidly.

Figure 4:
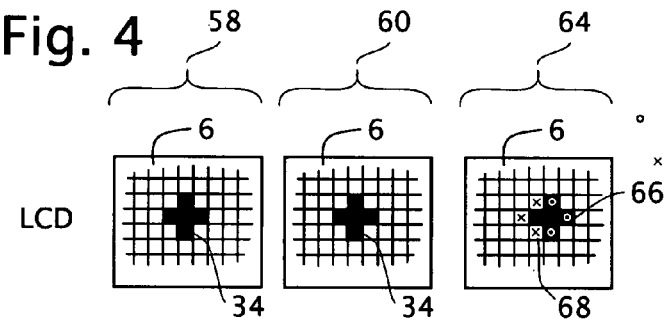

FIG. 4 illustrates how this can be used to track a moving light source. The masked area 34 of the LCD screen 6 corresponds to the oversaturated pixels 28 in the image sensor 14 in a given frame period 58. As a new frame period 60 begins, the previously masked pixels 34 in the LCD 6 remain opaqued. If the bright light is moving, then new pixels 62 in the sensor on the edge of the masked area, here marked with circles, will show oversaturation and will need to be masked by the appropriate signal to the LCD. This adjustment of masking is shown in a separate frame period 64, although rapid subsampling of the CCD during the frame period 60 may be able to generate this result and cause adaptive action in the LCD within the same frame period. If the detected oversaturated pixels are added to an edge of the masked area in the LCD as shown by the pixels marked with circles 66, it can be assumed that the bright light has therefore moved away from the opposite edge of the previously masked area, and that the corresponding pixels on the opposite edge 68, here marked with X's, can therefore be cleared. In this way, the masked area can be made to follow the bright light over successive frame periods, and the masked image that is created on the CCD 70 will tend to follow the shape and movement of the light source.

Figure 5:
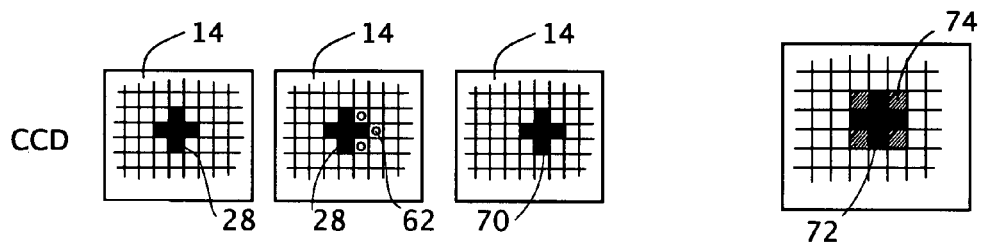
FIG. 5 Illustration of variable opacity in an image mask.

As shown in FIG. 5, the opacity of the pixels of the LCD can be varied to improve the anti-aliasing of the masked area.

A masked area can include both areas where a maximum opacity is applied to the LCD such as the pixel at 72 and other areas such as the pixel at 74 where partial opacity is applied. In an LCD, this is typically the result varying the voltage addressing a pixel location, which varies the amount of twist in the crystal structure and thus the amount of opacity. This variance of opacity makes a smoother overall outline to the masked area.

The ability of the lens to focus on the pixels of the LCD screen affects the clarity of the masked pixels as they appear to the image sensor. If the pixels are out of focus on the LCD screen, then any masking of the pixels will be diffused accordingly. If the pixels are in focus, then the effect of the masked pixels will be more nearly limited to its corresponding pixels on the image sensor. However, if the LCD screen is too much in focus, then other elements of the screen, such as any small opaque electronic elements that are in the screen, will also be visible to degrade the quality of the image. A better compromise is to have the screen very slightly out of focus, but not so the circle of confusion is greater than the diameter of two pixels. Certain lenses, such as longer focal length telephoto lenses, will have more of a tendency to keep objects close to the lens out of focus, while wide angle lenses will maintain focus not only on the object of interest but also on objects close to the lens. Because of this, this type of active filter may work best on wide-angle lenses.

Figure 6:
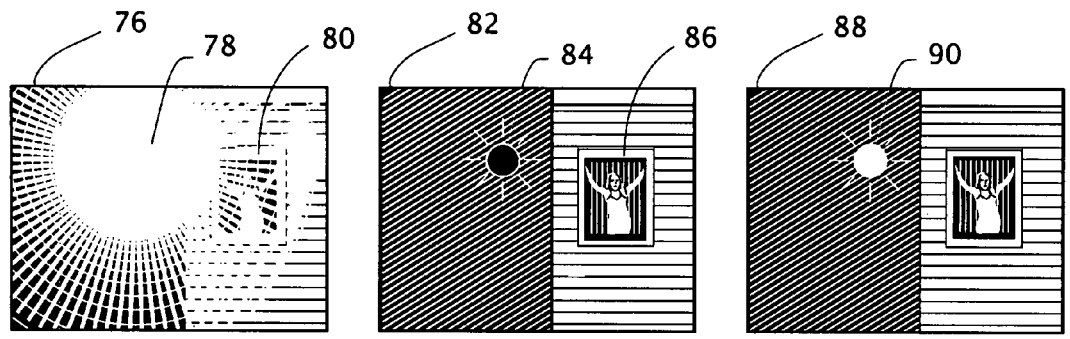
FIG. 6 Illustration of s subsequent filling of a masked area to make a final composite image.

FIG. 6 shows how the masked image will show greater detail than would otherwise have been visible in the area around the mask. In the first view 76, a bright light source at 78 causes glare effects that obscure an item of interest 80. In the second view 82, a mask 84 applied to the bright light source by the active filter minimizes the glare effects and allows the object of interest to be seen more clearly at 86. However, the mask creates a dark patch in the image over what would normally be a light. In the third view 88, as a final stage to creating an optimal image, this dark patch is filled with white 90, or another color representing the color of the bright light, to make a final composite image.

This approach to glare suppression can be applied to masking the effects of bright light sources of all types. In addition to the effect of the sun, it will also shield an imaging system from headlights and streetlights at night. Other blinding lights, such as welding torches or the flare of a machine gun muzzle flash, can be suppressed by this method.

Figure 7:
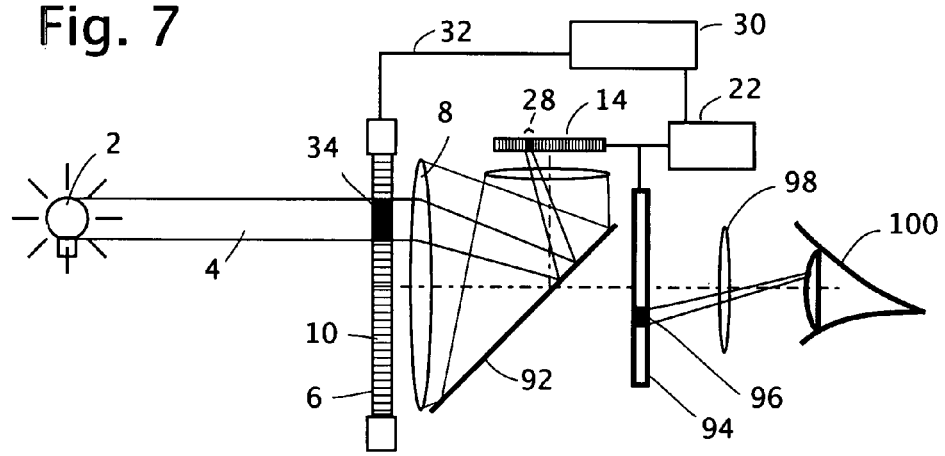
FIG. 7 Optical apparatus oriented to an observer, including a display screen.

FIG. 7 shows how the active filter system can be self-contained for direct viewing by an operator. For these purposes, the best solution is an imaging system aligned to the eyes in the form of head-mounted imaging glasses. In this way one can seem to be looking directly at the bright light source, as in normal vision, and the masking will appear as needed. A bright light source is at 2. The imaging glasses include an LCD screen at 6, and a lens 8. To reduce the length of the overall optical path, a right-angle reflector 92 can be used to direct the light to the image sensor at 14, with a limiting circuit processor 22 to identify oversaturated pixels 28 and a masking signal processor 30 sending a masking signal 32 back to the LCD screen 6 in front of the lens for creating masked pixels 34. There is also a display screen 94 for the display of the image, including the masked area 96, for viewing through associated optics 98 by an observer 100. The final displayed image can include a filled or unfilled masked area as desired.

The images produced using this method can be recorded and distributed, in the usual methods developed for the image sensors, to give an even clearer picture of the world.

Recent developments in transparent electronics lend themselves to use in an active filter, because if transparent transistors and other elements are used in an LCD they allow better control of the picture elements in the filter while blocking less of the transmitted light. Previous forms of LCDs were less transparent because of the opacity of the transistors at the borders of the pixels, and this tended to block the light and diffuse the image. An example of this research in transparent electronics is the work done at Oregon State University, which created the world's first transparent transistor in 2003, and further refined it into a transparent integrated circuit in 2006. A manufacturing method for transparent electronics suitable for both glass and plastics has also been reported by Northwestern University, as reported in the November 2006 issue of *Nature Materials*.

It will be appreciated by one skilled in the art that the present disclosure can also be presented in other embodiments. For example, the principle of dynamic masking of one or more bright lights can be applied to a reflective screen as well as a transparent screen. For example, the pixels of a DLP reflector can be varied to prevent only the area of a bright light into a lens. The same principle of a variable reflector can be applied to Liquid Crystal on Silicon (LCOS) and Light Valve Reflectors as well.

An adaptive filter of this type can also be used to control the performance of an image sensor in other ways. It could shield the image sensor from certain colors, or suppress certain levels of exposure to improve the appearance and dynamic response of either highlights or shadows.

It also can enhance the performance of amplified vision system, such as night vision displays, which are especially liable to oversaturation from bright light sources.

It will be recognized that certain of these improvements likewise find applications in other contexts, e.g., multiple sensor imaging systems, and stereoscopic systems where multiple offset camera systems are used. Similarly, although image sensors operating in the visible light spectrum are described, the same principles can likewise be applied for sensors operating at other wavelengths.

The location of the variably transmissive screen is here described as being in front of the lens, but it could also have additional lens elements in front of it for better overall optical performance.

It will be evident to artisans that features and details given above are exemplary only. Except where expressly indicated, it should be understood that none of the given details is essential; each is generally susceptible to variation, or omission.

I claim:

1. A method for actively filtering a light image in a motion-picture camera comprising:

transmitting light representing components of a field of view successively through a variably transmissive screen having a first grid of addressable pixels formed thereon, a lens and finally into an associated image sensor having a second grid of pixels formed thereon, with the light transmitted to each of at least some of the pixels on the image sensor also passing through a generally corresponding pixel on the variably transmissive screen;

accumulating electrical charges for each of the pixels of the image sensor as a result of said light representing the components of the field of view for a time span of a given frame period;

identifying a location of a first pixel on the image sensor whose electrical charge exceeds a given level, representing excess light producing at least one overexposed pixel;

addressing a first pixel in the first grid that corresponds in location to the identified location of the first overexposed pixel;

masking the addressed pixel starting at a first time of the given frame period, thereby at least partially blocking the transmission of light into the lens and reducing the exposure of the at least one overexposed pixel;

addressing a second pixel in the first grid; masking the second pixel starting at a second time of the given frame period;

a reading out electrical charges for at least some of the pixels on the image sensor to produce a final image; and analyzing one or more groups of overexposed pixels to identify an overall shape of each group of overexposed pixels, wherein said overall shape remains roughly the same over successive frame periods, and any additional overexposed pixels detected along one border of said overall shape generate a corresponding masking signal for said additional overexposed pixels and a clearing of the masking signal for the pixels along an opposite border of said overall shape relative to said additional overexposed pixels, thereby maintaining said shape of said group of overexposed pixels, and moving said overall shape to follow one or more moving lights over successive frame periods.

2. The active filter method of claim 1, wherein any overexposed pixels identified during a first part of a frame period are used to mask at least one pixel of the variably transmissive screen during a second part of a frame period.

3. The active filter method of claim 1 wherein variable degrees of opacity are produced in the pixels of the variably transmissive screen by the masking signal to improve anti-alias characteristics of the masking of overexposed pixels.

4. The active filter method of claim 1 wherein the variably transmissive screen is a liquid crystal display.

5. An active filter apparatus, comprising:
a lens allowing for passage of light associated with a field of view;
an image sensor configured to receive light passed by said lens, said image sensor having a plurality of pixels, wherein the light associated with the field of view is converted into pixel values, each pixel value representing the light intensity of a particular portion of the field of view during a given frame period;
a variably transmissive screen located in front of said lens, said variably transmissive screen also having pixels which correspond to the pixels of the image sensor;
a storage processor for storing successive pixel values for at least one pixel from the image sensor during a frame period, including location within the field of view of said pixel values and an identification of any of said pixel values that exceed a given overexposure threshold, representing excess light entering the lens at at least one location in the field of view and producing at least one overexposed pixel; and
a masking processor which generates and sends a masking signals that are a function of said successive pixel values during the frame period to successively mask at least one pixel in the variable transmissive screen which corresponds to the at least one overexposed-pixel of said image sensor, thereby at least partially blocking the passage of light into the lens and the image sensor at at least one location in the field of view and preventing the overexposure of at least one
pixel of said image sensor due to the excess light during a second frame period, wherein an overall shape of a group of overexposed pixels remains essentially the same over successive frame periods, and if additional overexposed pixels are detected along one border of said overall shape, the masking processor is configured to generate and send a masking signal that covers the additional overexposed pixels up in a subsequent frame period and that clears the pixels along an opposite border of said overall shape so as to maintain said shape of said group of overexposed pixels, thereby enabling the masking processor to follow one or more moving lights.

6. The active filter apparatus of claim 5, wherein a motion picture is produced by repeated readout of the image sensor in frame periods, and any overexposed-pixels identified in said storage processor during the first part of a frame period are used to generate the masking signal to be sent to the variably transmissive screen during the second part of the frame period.

7. The apparatus of claim 5 wherein variable degrees of opacity are producible in the pixels of the variably transmissive screen responsive to at least some of the masking signals to improve the anti-alias characteristics of the masking of overexposed pixels.

8. The apparatus of claim 5 wherein the variably transmissive screen is a liquid crystal display.

9. The apparatus of claim 5 wherein the variably transmissive screen transmits light by reflection.

10. The apparatus of claim 5 wherein the variably transmissive screen, lens and image sensor are disposed in the same optical path.

11. The apparatus of claim 5, wherein the lens has a focal point.

* * * * *